Figure 1:
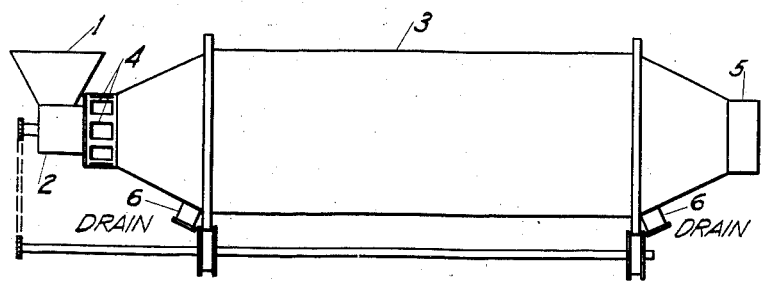
Figure 2:
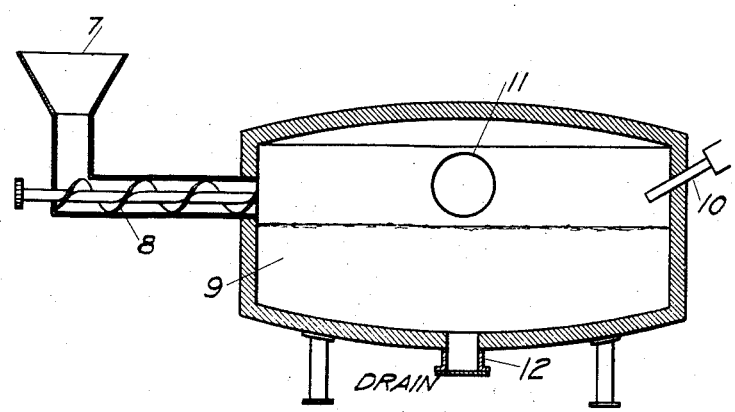

Jan. 31, 1928.

H. F. MERRIAM 1,657,545

PROCESS OF BURNING OR SUBLIMING SULPHUR

Filed May 6, 1926

INVENTOR
HENRY F. MERRIAM
BY
Forbes Sibley
ATTORNEY

Patented Jan. 31, 1928.

1,657,545

UNITED STATES PATENT OFFICE.

HENRY F. MERRIAM, OF WEST ORANGE, NEW JERSEY, ASSIGNOR TO GENERAL CHEMICAL COMPANY, OF NEW YORK, N. Y., A CORPORATION OF NEW YORK.

PROCESS OF BURNING OR SUBLIMING SULPHUR.

Application filed May 6, 1926. Serial No. 107,092.

My invention relates to a process of and apparatus for burning or subliming sulphur, and more particularly to a process of and apparatus for burning sulphur in which the sulphurous acid gas produced is to be used in the manufacture of sulphuric acid by the contact process. My invention is especially applicable in the process of manufacturing sulphuric acid wherein the sulphur dioxide produced by burning sulphur is passed from the burner to a platinum type converter without intermediate cold purification as disclosed and claimed in the United States patent to Merriam, No. 1,384,566.

The objects of my invention are to afford increased efficiency in operation as compared with the prior practice and at all times, substantially irrespective of the amount of impurities in the raw sulphur, to maintain the amount of impurities in the burner gases, as for example ash and arsenic, below that at which harmful contamination of the catalytic contact material would normally occur if such gases be passed to such contact material without cold purification. A further object of my invention is to provide for substantially continuous operation of the burner, thereby avoiding the necessity of stopping normal operation in order to "burn out" and clean the burner as required in the present practice. A still further object is to avoid the necessity of passing sulphur dioxide gas containing large amounts of impurities, as is the case when "burning out" a burner, into the converter system, which would have an extremely deleterious effect upon contact material and which under the present practice requires the well-known cold purification process in order to render said gas sufficiently free from impurities to permit it to be passed to the converter system. Other objects and advantages of my invention will appear from the following specification.

Fig. I is an elevation of a conventional type of rotary sulphur burner and Fig. II is a sectional elevation of a conventional type of stationary burner, each provided with means for carrying out my novel process as described herein.

Up to the present time it has been the practice to burn the sulphur in the various well-known types of burners wherein the sulphur is continuously fed to the burners until a large amount of dross collects in the burners and the sulphur dioxide containing gas being produced becomes highly contaminated with arsenic and ash dust. The sulphur feed is then discontinued and the air supply continued until all the sulphur remaining in the burner is burned out. The ash remaining may be raked out, new sulphur fed in and the operation repeated. This process of "burning out" as it is termed, produces a very highly contaminated sulphur dioxide gas having an arsenic content very much in excess of that occurring in normal operation of the burner due to the volatilization of the arsenic which is concentrated in the burner contents as normal burning takes place. The gas also carries with it large quantities of dust and ash mechanically suspended which must be removed before it may be admitted to the converters. In view of the fact that the sulphur dioxide gas creates a nuisance if discharged to the atmosphere, this impure sulphur dioxide gas must necessarily be passed through the converter system and subsequently absorbed. The "burning out" process as it is now carried on, is required about once in every two months.

In the prior practice for the production of sulphuric acid by the contact process the sulphur dioxide gas is passed through a system of cold purification to remove all arsenic and dust or ash. When employing this practice, it is not of as vital importance to employ an uncontaminated sulphur dioxide burner gas since the impurities may be removed by the cold purification. However, even in this event, a highly contaminated burner gas will have a more or less deleterious effect on the purification system.

But in the production of sulphuric acid by the contact process wherein the sulphur dioxide gas is passed to the converter system without intermediate cold purification, it becomes of very vital importance to produce a burner gas which is substantially free from such impurities as would have a harmful effect upon the platinum contact material. If a highly contaminated sulphur dioxide gas produced prior to the "burning out" and during the "burning out" period, were passed to the converters without purification, the high arsenic content therein would tend to poison the platinum contact material and the large amount of ash carried along in the gas, being deposited in the converter would eventually form a mat which would practically stop the gas flow and thereby render the converter inoperative.

By my invention I have overcome these difficulties and provided a process for the manufacture of sulphur dioxide burner gas whereby the per cent of impurities in a gas produced from a given grade of brimstone is maintained at a more constant value and at a considerably lower value than has heretofore been considered possible. The advantages of the process in connection with the manufacture of sulphuric acid by the contact process, in which the arsenic and ash content of the gases must be closely controlled, are obvious. However, it is clear that the invention is of value generally in the production of pure sulphur dioxide gas.

My novel process may be carried on in any of the well-known types of sulphur burners when modified as herein described and I do not wish to limit myself to its practice in any particular type. In order, however, that its operation may be clear to one skilled in the art, I will now point out how my novel process may be carried out, for example in the well-known rotary type of sulphur burner. In the operation of a rotary type burner, as for example a burner of the Glens Falls type as shown in Fig. I, sulphur in the solid form is continuously fed through a hopper 1 and through conveyor 2 to a rotary burning cylinder 3. Air is admitted through ports 4 and the burner gas comprising $SO_2$ and a considerable amount of sublimed sulphur, leaves through an opening 5 and passes to a combustion chamber. In the practice of my process the burner is also provided with a drain opening 6 located either near the inlet or exit ends of the burner, or both, as shown in the drawing. As the burning operation takes place, the ash content and also the arsenic content of the raw sulphur being fed in, gradually concentrates in the melted sulphur in the burner and is retained thereby. I have discovered that as long as the ash content of the melted sulphur in the burner is maintained below a limiting value practically no ash will be carried along with the burner gas. I have also discovered that the arsenic in the raw sulphur fed in will be to a very substantial amount retained in the melted sulphur in the burner and will not pass along with the burner gas, provided its concentration in the melted sulphur does not become too high.

In order to employ these features which I have discovered I carry out my novel process in the following manner. The burner is fed with sulphur which is burned as in the present practice until the concentration of the arsenic or ash impurities has reached a limiting predetermined value, at which value the burner gas commences to become so contaminated as to require cold purification before it may safely be delivered to any converter system of the platinum type. At this point the sulphur feed is stopped. The burner is also stopped in its rotary movement and in such a position that the drain openings are at the lowest point of travel. The caps of the drain openings are quickly removed and the melted sulphur allowed to run out by means of troughs into suitable collecting tanks. A large proportion of the melted sulphur containing the concentrated impurities will run out quickly. In practice about 50-80% of the total contents of the burner is thus drained off, though under varying conditions as much as 90% and as little as 35% may be drained as desired. The caps are then replaced, a considerable amount of raw sulphur fed in and the burner started again in operation. As is quite obvious, the concentration of impurities in the melted sulphur is, at this point, far below that which would harmfully contaminate the burner gas and a normal operation of the burner may be continued until the concentration of the impurities again rises to the predetermined limiting value.

It will be observed that the time in which the burner is stopped is comparatively short and also that all the impurities which in the present practice are passed into the subsequent purification and converter systems are in my process withdrawn thereby preventing any deleterious effects which would arise from their passage into the system.

As stated above, I have discovered that by maintaining the concentration of the impurities below a given value in the melted sulphur, practically all the ash and a substantial amount of the arsenic fed to the burner in raw material is retained. If the ash content of the melted sulphur in the burner is not permitted to rise above approximately 8%, I find that substantially no ash dust is carried along with the burner gas. I prefer however to permit the ash to concentrate only to about 5-7%, and then drain the burner, although in case the ash is concentrating very rapidly I have permitted the ash to concentrate to as high as 12-14% of the burner contents without producing a burner gas containing harmful contamination.

The proper limiting value is also considerably affected by the nature of the ash as would be apparent to one skilled in the art. Where the ash is fine and easily carried along by the gas stream, the limiting value must be quite closely adhered to, but where the ash is of such a coarse nature, as for example in the nature of sand or stone, that it will not be carried with the gas stream, the per cent of ash may rise to a much higher value. Reference, therefore, must be had to the nature of the ash in the brimstone when applying specific values.

The proper time in which to drain the burner may be roughly determined by observation of the burner gas as it leaves the burner. Under normal operation, when the gases are free from harmful ash contamination, the flame is substantially free from luminous particles but as the ash concentrates and reaches its limiting value, the flame becomes quite luminous, indicating that a considerable quantity of ash is being carried along in the burner gas. When this occurs the burner should be drained.

In carrying out my process I have discovered that when the ash is permitted to concentrate to about 5–7% of the burner contents, approximately from 30–35% of the arsenic introduced into the burner in the raw material is retained in the melted sulphur in the burner and may be drained off. This is of great importance in view of the highly deleterious effect of arsenic upon the platinum contact material. Where the per cent of arsenic concentrates in the burner to an abnormal value due to an unusually large amount in the raw material, the burner may of course be drained, regardless of the ash content, in order to rid the burner of this arsenic.

Where some filter means or hot purification is employed between the burner and the converter to remove arsenic, it is unnecessary to thus restrict the limiting value of the arsenic concentration. In this latter case it is still of great importance to maintain the ash content below the limit specified in order that the filters employed shall not become loaded with impurities and solid matter which would restrict the gas flow and prevent proper removal of the arsenic.

In applying my process to a burner of the type shown in Fig. II, wherein the sulphur containing means is stationary, certain advantages are realized to a fuller extent than in the rotary type of burner. In this type of burner, sulphur in solid form may be fed by means of a hopper 7 and conveyor 8 to a melting chamber 9. Air is admitted to the chamber above the surface of the melted sulphur, by means of a pipe 10 and the burner gas and sublimed sulphur are removed through a port 11. The burner may be provided with a bottom sloping toward a drain opening 12. This opening is provided with a suitable cap easily removable when desired. In this type of burner the impurities concentrate as pointed out in the case of the rotary type burner, as the burning proceeds. Also there is a separation of these impurities by settling, tending to considerably increase their concentration in the lower portion of the burner. Accordingly, as the melted sulphur which is subject to burning, reaches an ash concentration with a limiting value specified, the melted sulphur near the bottom of the burner will contain a somewhat higher percentage of impurities and as withdrawn from the burner according to the practice of my novel process will remove relatively more of the contaminating impurities present in the raw sulphur than is possible when operating with a rotary type burner.

Furthermore, in the process of draining the stationary type of burner it is unnecessary to stop the supply of sulphur or air, but the burner may be continued in operation as desired during the draining process. My process as applied to this type of burner provides for substantially continuous operation of the burner if desired.

It will be observed that my process is equally as applicable to the practice of subliming sulphur without any substantial oxidation as to the practice of burning a comparatively large amount of sulphur in the burner with little sublimation. In either case the concentration of the impurities in the melted sulphur increases as sulphur is eliminated from the burner. I intend to include as a part of my invention the application of my process to this process of subliming sulphur.

In the disclosure thus far I have specified that the sulphur fed into the burner is in the solid state. However, it is obvious that melted sulphur could be employed if desired and its use does not affect the operation of my process.

While it is preferable in carrying out my process to drain the burner periodically as determined by the rate of concentration of the impurities, nevertheless I do not wish to limit myself to this method of operation as my process may be carried out by continuously withdrawing a portion of the burner contents, thereby maintaining at all times a concentration of the impurities below the specified limit.

It will be observed that in carrying out my process as disclosed herein, I am able to remove a very large amount of impurities in the raw sulphur from the system and produce a burner gas which is substantially free from such impurities. The burner gas thus produced is therefore in such a state of purity that it may be passed to converters of the platinum type without the usual cold purification process.

Various modifications may be made and my process may be carried out in various types of burners without departing from the spirit of my invention, and I do not wish to limit the scope of my invention except as defined in the appended claims.

I claim:

1. In the manufacture of sulphuric acid by the contact process, wherein the burner gases are passed to the converter system without cold purification, the process of burning or subliming sulphur which comprises the step of noting the condition of the gas given off by the burner with reference to impurities carried along thereby and draining off a portion of the contents of the burner to remove concentrated impurities whenever by the noted conditions the concentration of impurities approaches a predetermined condition.

2. In the manufacture of sulphuric acid by the contact process, wherein the burner gases are passed to the converter system without cold purification, the process of burning or subliming sulphur which comprises the step of draining off a portion of the contents of the burner to remove concentrated impurities.

3. In the manufacture of sulphuric acid by the contact process, wherein the burner gases are passed to the converter system without cold purification, the process of burning or subliming sulphur which comprises the step of draining off 50-80% of the contents of the burner.

4. In the manufacture of sulphuric acid by the contact process, wherein the burner gases are passed to the converter system without cold purification, the process of burning or subliming sulphur which comprises the step of maintaining at all times the amount of ash in the burner less than approximately 8% of the total contents by draining off a portion of the contents of the burner whenever the ash in said burner approaches said percentage.

5. In the manufacture of sulphuric acid by the contact process, wherein the burner gases are passed to the converter system without cold purification, the process of burning or subliming sulphur which comprises the step of draining off a portion of the contents of the burner whenever the amount of ash in the burner contents is such as to yield a substantially luminous burner gas flame.

6. In the manufacture of sulphuric acid by the contact process, wherein the burner gases are passed to the converter system without cold purification, the process of burning or subliming sulphur which comprises the step of maintaining at all times the amount of ash in the burner less than approximately 8% of the total contents by periodically draining off from 50-80% of the melted sulphur in the burner whenever the ash in said burner approaches said percentage.

7. The process of burning or subliming sulphur which comprises the step of draining off a portion of the melted sulphur from the burner or sublimer containing concentrated impurities to remove said impurities.

8. The process of burning or subliming sulphur which comprises the step of periodically draining off a portion of the melted sulphur in the burner or sublimer containing concentrated impurities when said impurities have been concentrated in the burner or sublimer to a predetermined value.

9. A process of burning or subliming sulphur which comprises the step of draining off a portion of the melted sulphur in the burner or sublimer containing concentrated impurities without substantial interruption of the operation of the burner or sublimer.

10. A process of burning or subliming sulphur which comprises the step of periodically draining off a portion of the melted sulphur containing concentrated impurities without substantial interruption of the operation of the burner or sublimer.

11. The process of burning or subliming sulphur which comprises a step of maintaining the ash content of the sulphur in the burner or sublimer below approximately 8% of the total contents by periodically draining off a portion of the melted sulphur in the burner or sublimer containing concentrated impurities whenever the ash in said burner approaches said percentage.

12. The process of burning or subliming sulphur which comprises the step of draining off from 50-80% of the melted sulphur in the burner or sublimer containing the concentrated impurities when said impurities have been concentrated in the burner or sublimer to a predetermined value.

13. The process of burning or subliming sulphur which comprises the step of maintaining the ash content of the sulphur in the burner or sublimer below approximately 8% by periodically draining off 50-80% of the melted sulphur in the burner or sublimer containing the concentrated impurities whenever the ash in said burner approaches said percentage.

14. The process of burning or subliming sulphur which comprises the step of periodically draining off a portion of the melted sulphur in the burner or sublimer containing the concentrated impurities when the burner gas flame becomes substantially luminous.

15. In the process of burning sulphur, the steps of maintaining a body of melted sulphur, promoting combustion of said sulphur and periodically withdrawing a portion of the melted sulphur containing concentrated impurities.

16. In the process of burning sulphur, the steps of maintaining a body of melted sulphur, promoting the combustion of said sulphur and withdrawing a portion of the melted sulphur containing concentrated impurities to maintain the per cent of impurities in the burner below a predetermined value.

17. In the process of burning sulphur, the steps of maintaining a body of melted sulphur, promoting combustion thereof, periodically withdrawing a portion of the melted sulphur containing concentrated impurities, and maintaining the ash content of the sulphur in the burner below approximately 8%.

18. A process for producing sulphur dioxide or sublimed sulphur which comprises converting sulphur from a pool of molten sulphur into such gaseous form, retaining in the pool impurities such as ash and arsenic, allowing the content of such impurities to rise until it approximates 8%, drawing off a portion of the pool having such impurities and replacing the portion so drained by a fresh quantity of sulphur.

In testimony whereof I have hereunto set my hand.

HENRY F. MERRIAM.